United States Patent Office 3,597,387
Patented Aug. 3, 1971

3,597,387
STABILIZED OXYMETHYLENE POLYMERS
Leon Starr, Plainfield, and David Jon Runyon, Brick Township, Ocean County, N.J., assignors to Celanese Corporation, New York, N.Y.
No Drawing. Filed Sept. 15, 1969, Ser. No. 858,146
Int. Cl. C08g 51/08, 51/60
U.S. Cl. 260—37AL                                    12 Claims

ABSTRACT OF THE DISCLOSURE

Pigmented oxymethylene polymers are stabilized by a novel stabilizer which comprises a phosphine or phosphine oxide, an oxymethylene polymer antioxidant, a metal oxide and a modified fatty acid polyamide. This unique stabilizer need only be used in very limited quantities to impart an improvement in thermal stability. A preferred composition comprises (A) a tertiary phosphine oxide, (B) a phenolic antioxidant, (C) an alkaline earth metal oxide and (D) a modified fatty acid polyamide. On molding these novel compositions, there are no mold deposits.

BACKGROUND OF THE INVENTION (1) Field of the invention

This invention relates to oxymethylene polymers. More particularly it relates to stabilization of moldable pigmented oxymethylene polymers by a novel stabilizing system which does not leave mold deposits upon molding.

The term oxymethylene polymer as used herein is meant to include oxymethylene homopolymers and diethers and diesters. Also included are oxymethylene copolymers, which includes oxymethylene polymers having at least 60 percent recurring oxymethylene units and at least one other unit derived from a monomer copolymerizable with the source of the oxymethylene units. Among the copolymers which are utilized in accordance with this aspect of the invention are those having a structure comprising recurring units having the formula

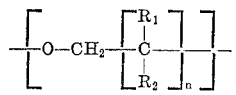

wherein each $R_1$ and $R_2$ is selected from the group consisting of hydrogen, lower alkyl of from 1 to 4 carbon atoms, and halogen substituted lower alkyl radicals of from 1 to 4 carbon atoms and wherein $n$ is an integer from zero to 5 and wherein $n$ is zero in from 60 to 99.6 percent of the recurring units.

A preferred class of copolymers are those having a structure comprising recurring units having the formula $(-O-CH_2-(CH_2O)_n-)$ wherein $n$ is an integer from zero to 2 and wherein $n$ is zero in from 60 to 99.6 percent of the recurring units. These copolymers are prepared by copolymerizing trioxane with a cyclic ether having the structure

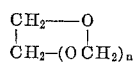

where $n$ is an integer from zero to two.

Among the specific cyclic ethers which may be used are ethylene oxide, 1,3-dioxolane, 1,3,5-trioxepane, 1,3-dioxane, trimethylene oxide, pentamethylene oxide, 1,2-propylene oxide, 1,2-butylene oxide, neopentyl formal, pentaerythritol diformal, paraldehyde, tetrahydrofuran, and butadiene monoxide.

(2) Description of the prior art

Oxymethylene polymers having recurring $-CH_2O-$ units have been known for many years. They may be prepared for example, by the polymerization of anhydrous formaldehyde or by the polymerization of trioxane, which is a cyclic trimer of formaldehyde, and will vary in physical properties such as thermal stability, molecular weight, molding characteristics, color and the like depending, in part, upon their method of preparation, on the catalytic polymerization technique employed and upon the various types of comonomers which may be incorporated into the polymer.

While these high molecular weight oxymethylene polymers are relatively thermally stable, various treatments have been proposed to increase the polymers' utility by increasing its thermal stability. Among these are end capping of hemiformal groups of polyoxymethylene homopolymers and hydrolysis to remove unstable groups of oxymethylene in copolymers containing interspersed stable units, such as ethoxy groups.

Even beyond these treatments it has been found necessary to incorporate various stabilizers, antioxidants and chain-scission inhibitors into the polymers. These additives have been found very effective in lowering the thermal degradation rate of the polymer. However, when these additives are admixed into a pigmented oxymethylene polymer composition the thermal degradation rate of the pigmented oxymethylene polymer increases markedly over the thermal degradation rate of the unpigmented oxymethylene polymer composition containing such additives. Also, it has been found that stabilized pigmented oxymethylene polymer compositions leave mold deposits in the mold when used in molding operations. Necessary mold cleanings are difficult and result in much time lost.

Accordingly, it is an object of our invention to devise a stabilizer system which will effectively reduce the thermal degradation rate of a pigmented oxymethylene polymer.

It is another object of our invention to provide a thermally stable pigmented oxymethylene polymer which will not leave mold deposits in the mold when the compositions are molded.

SUMMARY OF THE INVENTION

We have found that a particular stabilizing system comprising a phosphine compound or a tertiary phosphine oxide, an oxymethylene polymer antioxidant, a metal oxide and a modified fatty acid polyamide when incorporated into a pigmented oxymethylene polymer provide a composition of improved thermal stability, and when the composition is molded does not leave behind mold deposits. Preferably, the pigmented oxymethylene polymer composition comprises a pigmented oxymethylene polymer having admixed therein a minor proportion each of (A) a tertiary phosphine oxide, (B) an alkylene bis-phenol antioxidant, (C) an alkaline earth metal oxide such as MgO, and (D) a modified fatty acid polyamide.

The stabilizer system of our invention may be used in conjunction with a pigmented oxymethylene polymer composition, wherein the pigment material is black, white, red, blue, green or any other pigment well known in the art, or any tint, shade or combination thereof. In addition, the stabilizer system of our invention may be used in conjunction with a pigmented oxymethylene polymer composition wherein the pigment material is carbon black.

DESCRIPTION OF THE PREFERRED EMBODIMENTS

The preferred component (A) of our stabilizer system is a tertiary phosphine oxide and can be represented by the formula

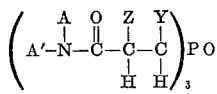

wherein A represents hydrogen, lower alkyl of from 1 to 4 carbon atoms or phenyl, A′ stands for hydrogen or lower alkyl of from 1 to 4 carbon atoms, Z is hydrogen or methyl, and Y represents hydrogen, methyl or phenyl. These tertiary phosphine oxides can be produced by reacting an α,β-unsaturated amide with elemental phosphorus and a base, in the presence of water as disclosed in U.S. Pat. 3,067,251.

Representative tertiary phosphine oxides are: tris(2-carbamoylethyl) phosphine oxide; tris(N - ethyl - 2 - carbamoylethyl) phosphine oxide; tris(N - t - butyl - 2 - carbamoylethyl) phosphine oxide; and tris(N - butyl - 2 - carbamoylethyl) phosphine oxide. Other phosphine oxides than the tris(2-carbamoylethyl) phosphine oxides are effective, such as, tris(2-cyanoethyl) phosphine oxide.

Component (A) of our stabilizer system may also be a phosphine compound and can be represented by the formula:

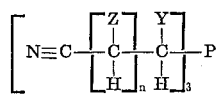

wherein $n$ represents an integer of the value of from 1 to 3, inclusive; Z is hydrogen or methyl and Y represents hydrogen, methyl or phenyl.

Representative of the phosphine compounds is tris(2-cyanoethyl) phosphine which can be represented by the following formula:

$$(N{\equiv}C{-}CH_2{-}CH_2)_3P$$

Also such compounds as tris(4-cyano-n-butyl) phosphine, tris(3 - cyano - n - propyl) phosphine, tris(1-phenyl - 2 - cyanoethyl) phosphine, tris(1 - phenyl - 2,3-dimethyl - 2 - cyano - n - propyl) phosphine, tris(1-phenyl - 2 - methyl - 2 - cyanoethyl) phosphine, tris(2,3-dimethyl - 2 - cyano - n - propyl) phosphine, tris(2-methyl-2-cyanoethyl phosphine and the like are effective.

Component (B) of the stabilizer system is an oxymethylene polymer antioxidant. Suitable antioxidants are alkylene bisphenols, thiobisphenols, polyhydroxyphenols, and amines.

Preferably the antioxidant is an alkylene bisphenol. A suitable class of alkylene bisphenols include compounds having from 1 to 4 carbon atoms in the alkylene group and having up to 2 alkyl substituents on each benzene ring, each alkyl substituent having from 1 to 4 carbon atoms. The preferred alkylene bisphenols are: 1,2-bis(2-hydroxy - 4 - methyl - 6 - t - butyl - phenyl) ethane; bis(2 - hydroxy - 4 - methyl - 6 - t - butyl - phenyl) methane; 1,1 - bis(3 - methyl - 4 - hydroxy - 6 - t - butyl-phenyl) ethane and 1,1 - bis(3 - methyl - 4 - hydroxy - 6 - t - butyl - phenyl) - n - butane and bis(2 - hydroxy - 3 - t - butyl - 5 - methyl - phenyl) methane. Suitable phenolic stabilizers other than alkylene bisphenols include 2,6 - ditertiary - butyl - 4 - methyl phenol, p-octyl phenol and p-phenyl phenol.

Component (C) is an alkaline earth metal oxide which when placed in water, yield a pH above 7. Typical of these oxides are; calcium oxide, magnesium oxide, barium oxide and aluminum oxide.

Component (D) of the stabilizer system is a modified fatty acid polyamide. Such modified fatty acid polyamides, and a process for their production, are disclosed in U.S. Pat. 3,383,391 issued to Daniel J. Carlick et al., assignors to Sun Chemical Corporation, on May 14, 1968.

In general these polyamides are prepared by reacting a mixture of polycarboxylic acids having more than one functional acid group with a polyamine in the presence of an aromatic polycarboxylic acid or anhydride thereof. The polycarboxylic acids should be reacted with the polyamine in sufficient amounts to provide a ratio of carboxyl to amino groups in the range of from about 0.6 to about 0.9. The aromatic polycarboxylic acid or anhydrides thereof should be present in sufficient amounts to provide a ratio of carboxyl groups from the aromatic polycarboxylic acid to amino groups of from about 0.05 to about 0.3, preferably about 0.1, to substantially neutralize the excess amino groups present. However, the ratio of the total carboxyl groups from both the aromatic and polycarboxylic acids to the amino groups from the polyamine should be from about 0.6 to about 0.9. The novel polyamides thus prepared have from about 1.8 to about 2.0 functional carboxyl and amine groups per mole.

Any high molecular weight fatty acid of 8 or more carbon atoms such as linoleic, linolenic, stearic, octadecadienoic acids, and the $C_{20}$, $C_{22}$, $C_{24}$ and $C_{26}$ fatty acids may be employed. Also fatty acid derivatives such as esters acid anhydrides and acylhalides of such fatty acids may be employed.

Suitable polycarboxylic acids also include the dimers and trimers of olefinically unsaturated monocarboxylic acids having from 10 to 20 carbon atoms, preferably 15 to 18 carbon atoms to the molecule, which acids may be the same or different in the dimer or trimer molecule, for example undecylenic acid, oleic, linoleic, and linolenic acids.

The polyamines which may be employed for the reaction with the polycarboxylic acids are those having the formula:

$$H_2N(RNH)_xH$$

where R is an alkylene radical having from 1 to 8 carbon atoms, and $x$ is an integer from 1 to 6. Preferably, the polyamines contemplated for usage herein are those of relatively short chain length, as for example, a chain length of from about 1 to 8 carbon atoms, preferably having from about 2 to 6 carbon atoms per molecule. Examples of such polyamines are ethylene diamine, trimethylene diamine, tetramethylene diamine, pentamethylene diamine, hexamethylene diamine, and diethylene triamine, triethylene tetramine, tetramethylene pentamine, 1,4-diaminobutane, 1,3-diaminobutane, 3-(N-isopropylamino) propylamine, 3,3′-imino-bispropylamine, and the like.

The aromatic polycarboxylic acids, or anhydrides thereof, are used as chain terminating agents. As such the aromatic polycarboxylic acids, or anhydrides thereof, react with the free amine groups to form imide groups which render the amine groups unavailable for further reaction with other polycarboxylic acid groups. A variety of aromatic carboxylic acids may be employed as chain terminating agents, particularly hydrogenated aromatic polycarboxylic acids having from about 8 carbon atoms to the molecule. For example, suitable aromatic polycarboxylic acids which can be employed are phthalic acid, tetrahydrophthalic acid, hexahydrophthalic acid, and anhydrides thereof.

In the preparation of these polyamides, the resin composition should have free acid groups and the relative number of these may be referred to as the acid number or acid value. Thus, the polyamides must have an acid value of at least 1 and preferably should have an acid value of from 5 to 8. The ratio of total acid value to total amine value of the polyamides must be in the range of 0.6 to 0.9, and more preferably in the range of 0.70 to 0.85. The polyamide composition thus described will have an average per mole functionality of between 1.8 to 2.0. By the term functionality we mean the number of reactive carboxyl groups and amine groups per mole of polyamide product.

The components of the stabilizer system are incorporated into the oxymethylene polymer in the following amounts. All percentages given below are weight percent, based upon the weight of the polymer.

The alkylene bisphenol is admixed in amounts not exceeding 5 weight percent and preferably from about 0.01 to about 1 weight percent, most preferably from 0.3 to about 1 weight percent, based upon the weight of the oxymethylene polymer.

The tertiary phosphine oxide or phosphine should be present from about 0.005 to about 0.5 weight percent, based on the weight of the polymer, preferably, from 0.01 to 0.05 weight percent. Good stability is obtained when more than 0.05 weight percent is used, but under certain molding conditions, anything above 0.1 weight percent will exude from the molded article. The exudate, however, is a white flaky non-polymeric material. It is the phosphine oxide, which is easily removed from the mold by wiping and is not to be confused with the nitrogenous mold deposits of the prior art systems which are polymeric in nature and difficult to remove.

The basic metal oxide should be present at from about 0.05 to about 0.5 weight percent and preferably from 0.05 to about 0.25 weight percent based upon the weight of the oxymethylene polymer.

The modified fatty acid polyamide should be present at from about 0.1 to about 1.0 weight percent and preferably from 0.3 to 1.0 weight percent based upon the weight of the oxymethylene polymer.

The thermal degradation rate of the polymer ($K_{D230}$) is measured by determining the percent weight loss of a sample of the polymer heated in an open vessel in a circulating air oven at 230° C. For example, the $K_{D230}$ of an unstabilized pigmented or non-pigmented oxymethylene copolymer of trioxane and ethylene oxide, which was subjected to hydrolysis to remove unstable end groups, is well over 1 percent per minute and generally results in a complete loss after 45 minutes at 230° C.

When the phosphine, the antioxidant and the basic metal oxide are admixed into the unpigmented polymer, $K_{D230}$ values of below about 0.1 weight percent loss per minute, and more specifically from about 0.01 to about 0.025 weight percent loss per minute, can be readily obtained when the basic metal oxide is MgO.

When pigment is incorporated into the oxymethylene polymer, phosphine, antioxidant and basic metal oxide stabilizer system, the $K_{D230}$ value increase to from about 0.031 to about 0.037 weight percent loss per minute when the pigment concentration is 0.5 weight percent based upon the weight of the oxymethylene polymer.

When pigment is incorporated into the oxymethylene polymer stabilized with only modified fatty acid polyamide the $K_{D2300}$ value is from about 0.31 to about 0.35 weight percent loss per minute.

When pigment is incorporated into the oxymethylene polymer, phosphine, antioxidant, basic metal oxide and modified fatty acid polyamide stabilized system, the $K_{D230}$ value is decreased to from about 0.017 to about 0.023 weight percent loss per minute.

The stabilized pigmented oxymethylene polymer compositions of our invention can be prepared by admixing the components of our stabilizer system with the unstabilized pigmented polymer in any suitable manner, whereby a substantially homogenous composition is obtained. For example the stabilizer components may be admixed intimately with the pigmented oxymethylene polymer by being applied in solution in a suitable solvent to the finely divided solid pigmented oxymethylene polymer followed by evaporation of the solvent.

The admixture may also be made by dry blending the finely divided pigmented oxymethylene polymer and finely divided stabilizers followed by extrusion or melt compounding or by milling the stabilizers into the pigmented polymer as the latter is worked on a rubber mill.

The stabilized pigmented oxymethylene polymer compositions also include if desired, plasticizers, lubricants and other stabilizers, e.g. stabilizers against degradation by ultraviolet light, e.g., 2,3'-dihydroxy - 4,4' - dimethoxybenzophenone; 2-hydroxy-4-methoxy-benzophenone; 2-hydroxy-4-methoxy-4'-chloro-benzophenone, and the like, which can be incorporated in amounts of about 1% by weight based upon the weight of the oxymethylene polymer.

In order that those skilled in the art may better understand how the present invention can be carried into effect, the following examples are given by way of illustration and not by way of limitation. All parts are weights and percentages are by weight based on the weight of the polymer unless otherwise stated.

Unless otherwise stated, the oxymethylene polymers used in the following examples is an oxymethylene copolymer of trioxane and ethylene oxide which was prepared as described in Example I of U.S. Pat. 3,254,053 issued to G. Fisher, F. Brown and W. Heinz on May 31, 1966.

Catalyst residues in the polymer were deactivated with an amine as described in U.S. Pat. 2,989,509 issued to D. Hudgin and F. Berardinelli on June 20, 1961.

The polymer is then subjected to hydrolysis to remove unstable terminal units as described in U.S. Pat. 3,318,848 issued to C. Clark on May 9, 1967.

EXAMPLE I

The thermal degradation rate of pigmented and non-pigmented trioxane-ethylene oxide hydroxylated copolymer containing 2.4 percent by weight ethoxy units, was measured by placing samples of the pigmented and non-pigmented oxymethylene polymer in a circulating air oven at 230° C. The pigmented samples were prepared with the concentration of pigment material at about 0.5 weight percent based upon the oxymethylene polymer. Mercadium red, phthalo blue, chromium oxide green, titanium dioxide white, and carbon black pigments, and combinations thereof were tested. There was a complete loss of polymer product after 45 minutes, indicating the instability of the unstabilized pigmented or non-pigmented polymer.

EXAMPLE II

To 100 parts of a trioxane-ethylene oxide hydroxylated copolymer containing 2.4 percent by weight ethoxy units was added (a) 0.5 part of bis(2 - hydroxy-3-t-butyl - 5 - methylphenyl) methane as antioxidant;

(b) 0.01 part of tris(2-carbamoylethyl) phosphine oxide; and (c) 0.2 part magnesium oxide (MgO).

The components were dry blended, followed by extrusion of the mixture. Dry blending was accomplished by simply mixing the ingredients in a Henscheld mixer at high r.p.m. and high shear for 3 minutes. Extrusion was conducted on a Brabender Plasticorder with an extrusion head, with an L/D of 25/1 at a melt temperature of 430° F.

The $K_{D230}$ value of this composition was determined by the procedure of Example I and was 0.010 percent per minute weight loss.

EXAMPLE III

To 100 parts of a trioxane-ethylene oxide hydroxylated copolymer containing 2.4 percent by weight ethoxy units was added (a) 0.5 part of bis(2 - hydroxy-3-t-butyl - 5 - methylphenyl) methane;

(b) 0.01 part of tris(2 - carbamoylethyl) phosphine oxide;

(c) 0.2 part magnesium oxide (MgO); and (d) 0.5 part carbon black pigment.

The components were dry blended and the mixture extruded as in Example II.

The $K_{D230}$ value was determined by the procedure of Example I and was 0.037 percent per minute weight loss.

Red, white, blue, green and carbon black pigments, and combinations thereof, as shown in Example I, were tested with substantially similar results.

EXAMPLE IV-V

To 100 parts of a trioxane-ethylene oxide hydroxylated copolymer containing 2.4 percent by weight ethoxy units was added;

(a) 0.5 part carbon black pigment; and (b) Various amounts of Sunkem 526G—a modified fatty acid polyamide comprising the reaction product of a mixture of polycarboxylic acids having a major proportion of dimeric linoleic acids, ethylene diamine, and hydrogenated phthalic acid, sold by the Sun Chemical Corporation. The amounts used and the results obtained are set forth in Table I.

The components were dry blended and the mixture extruded as in Example II.

The $K_{D230}$ values were determined by the procedure of Example I.

Red, white, blue, green and carbon black pigments, and combinations thereof, as shown in Example I were tested with substantially similar results.

Hydrogenated phthalic anhydride, tetrahydrophthalic acid, tetrahydrophthalic anhydride, hexahydrophthalic acid and hexahydrophthalic anhydride were substituted for the hydrogenated phthalic acid in component (b) and tested with substantially similar results.

TABLE I

| Example: | Polymer, parts | Carbon black, parts | Modified fatty acid polyamide, parts | $K_{D230}$ |
|---|---|---|---|---|
| IV | 100 | 0.5 | 0.3 | 0.35 |
| V | 100 | 0.5 | 0.5 | 0.31 |

EXAMPLES VI-X

To 100 parts of a trioxane-ethylene oxide hydroxylated copolymer containing 2.4 percent by weight ethoxy units was added;

(a) 0.5 part bis(2-hydroxy-3-t-butyl-5-methyl-phenyl) methane;

(b) 0.01 part tris(2-carbamolyethyl) phosphine oxide;

(c) 0.2 part magnesium oxide (MgO)

(d) 0.5 part carbon black pigment; and (e) Various amounts of Sunkem 526G—a modified fatty acid polyamide comprising the reaction product of a mixture of polycarboxylic acids having a major proportion of dimeric linoleic acids, ethylene diamine, and hydrogenated phthalic acid, sold by the Sun Chemical Corporation. The amounts used and the results obtained are set forth in Table II.

The components were dry blended and the mixture extruded as in Example II.

The $K_{D230}$ values were determined by the procedure of Example I.

Red, white, blue, green and carbon black pigments, and combinations thereof, as shown in Example I, were tested with substantially similar results.

Hydrogenated phthalic anhydride, tetrahydrophthalic acid, tetrahydrophthalic anhydride, hexahydrophthalic acid and hexahydrophthalic anhydride were substituted for the hydrogenated phthalic acid in component (e) and tested with substantially similar results.

It is to be understood that the foregoing detailed description is given merely by way of illustration and that many other variations may be made therein without departing from the spirit of our invention as defined in the following claims.

What we claim is:

1. A pigmented oxymethylene polymer composition which comprises a pigmented oxymethylene polymer having incorporated therein:

(a) a tertiary phosphine oxide or phosphine present in amounts of from about 0.005 to about 0.5 weight percent, based upon said oxymethylene polymer said tertiary phosphine oxide having the formula

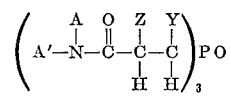

wherein A represents hydrogen, lower alkyl of from 1 to 4 carbon atoms or phenyl, A′ stands for hydrogen or lower alkyl of from 1 to 4 carbon atoms, Z is hydrogen or methyl, and Y represents hydrogen, methyl, or phenyl, and said phosphine having the formula

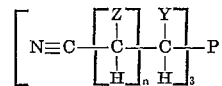

wherein $n$ represents an integer of the value of from 1 to 3 inclusive, Z is hydrogen or methyl, and Y represents hydrogen, methyl or phenyl;

(b) an oxymethylene polymer antioxidant present in amounts of from about 0.001 to about 1.0 weight percent, based upon said oxymethylene polymer;

(c) an alkaline earth metal oxide present in amounts of from about 0.05 to about 0.5 weight precent based upon said oxymethylene polymer;

(d) a polyamide composition having a functionality of from about 1.8 to 2.0 comprising the reaction product of a mixture of polycarboxylic acids having a major proportion of dimeric linoleic acids, an ethylene diamine, said mixture of dimeric acids and ethylene diamine being present in sufficient amounts to provide a ratio of carboxyl groups to amine groups of from 0.6 to 0.9; and a chain terminating agent selected from the group consisting of hydrogenated phthalic acid, hydrogenated phthalic anhydride, tetrahydrophthalic acid, tetrahydrophthalic anhydride, hexahydrophthalic acid, and hexahydrophthalic anhydride, said agent being present in an amount to provide a ratio of carboxyl groups to amine groups of from 0.05 to 0.3, said polyamide being present in amounts of from about 0.1 to about 1.0 weight percent based upon said oxymethylene polymer.

2. The composition of claim 1 wherein said oxymethylene polymer is a copolymer containing at least 60 percent recurring oxymethylene units.

3. The composition of claim 2 wherein said tertiary phosphine oxide is tris(2-carbamoylethyl) phosphine oxide.

TABLE II

| Example: | Polymer, parts | Antioxidant, parts | Phosphine oxide, parts | Alkaline earth metal oxide, parts | Carbon black, parts | Modified fatty acid polyamide, parts | $K_{D230}$ |
|---|---|---|---|---|---|---|---|
| VI | 100 | 0.5 | 0.01 | 0.2 | 0.5 | 0 | 0.037 |
| VII | | | | | | 0.1 | 0.023 |
| VIII | | | | | | 0.3 | 0.019 |
| IX | | | | | | 0.5 | 0.017 |
| X | | | | | | 1.0 | 0.018 |

4. The composition of claim 3 wherein said antioxidant is an alkylene bisphenol.

5. The composition of claim 4 wherein said alkylene bisphenol is bis(2-hydroxy-3-t-butyl-5-methyl-phenyl) methane.

6. The composition of claim 5 wherein said alkaline earth metal oxide is magnesium oxide (MgO).

7. The composition of claim 6 wherein said chain terminating agent is tetrahydrophthalic anhydride.

8. The composition of claim 6 wherein said chain terminating agent is hexahydrophthalic anhydride.

9. The composition of claim 6 wherein said chain terminating agent is a hydrogenated phthalic acid.

10. The composition of claim 6 wherein said chain terminating agent is tetrahydrophthalic acid.

11. The composition of claim 6 wherein said chain terminating agent is hexahydrophthalic acid.

12. The composition of claim 6 wherein said pigment material is carbon black.

References Cited

UNITED STATES PATENTS

| | | | |
|---|---|---|---|
| 3,067,251 | 12/1962 | Rauhut | 260—561P |
| 3,214,434 | 10/1965 | Grayson | 260—465.8 |
| 3,306,953 | 2/1967 | Fourcade | 260—45.9PA |
| 3,397,170 | 8/1968 | Fourcade | 260—45.9PA |
| 3,475,479 | 10/1969 | Vullo | 260—465.8 |

MORRIS LIEBMAN, Primary Examiner

P. R. MICHL, Assistant Examiner

U.S. Cl. X.R.

260—18N, 45.7R, 45.9P, 45.95

UNITED STATES PATENT OFFICE
CERTIFICATE OF CORRECTION

Patent No. 3597387      Dated August 3, 1971

Inventor(s) Leon Starr and David Runyon

It is certified that error appears in the above-identified patent and that said Letters Patent are hereby corrected as shown below:

In the specification in Column 5, line 72, "2,3'-dihydroxy-" should read -- 2,2'-dihydroxy-- ".

Signed and sealed this 28th day of December 1971.

(SEAL)
Attest:

EDWARD M. FLETCHER, JR.
Attesting Officer

ROBERT GOTTSCHALK
Acting Commissioner of Patents